United States Patent Office 3,632,842
Patented Jan. 4, 1972

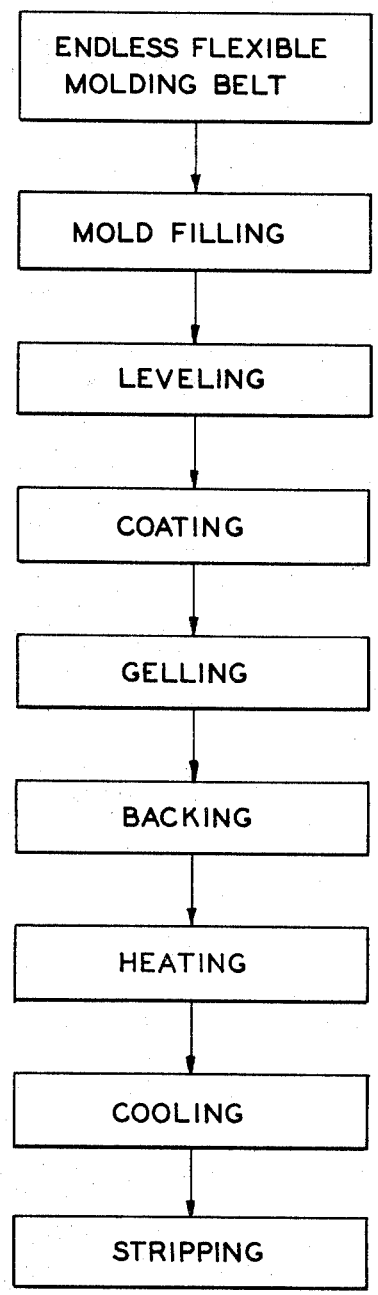

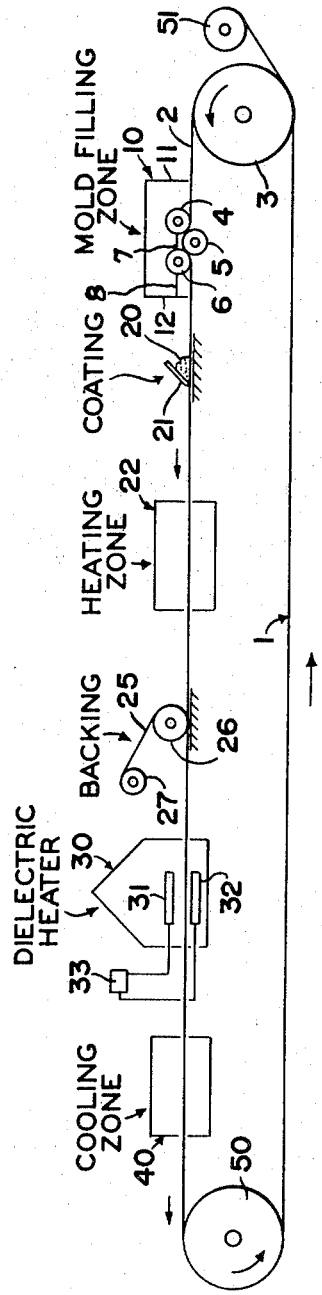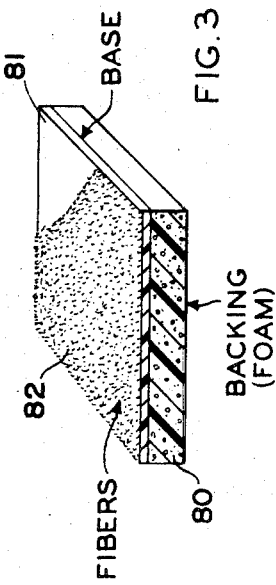

3,632,842
METHOD OF MAKING A SYNTHETIC SUEDE
Norman Forrest, Byram, Conn., assignor to
Tenneco Chemicals, Inc.
Filed Sept. 28, 1967, Ser. No. 671,304
Int. Cl. B29d 9/00
U.S. Cl. 264—47                                2 Claims

ABSTRACT OF THE DISCLOSURE

A process of producing a synthetic suede product from a polyvinyl chloride plastic material characterized by untapered plastic surface fibers with diameters thereof being a small fraction of their length, the density of the surface fibers ranging from about 10,000 to 500,000 per square inch, and having the appearance and shading characteristics of natural suede leather. This novel suede product is prepared by a continuous process which comprises the sequential steps of filling the mold cavities on the exposed surface of a flexible, endless molding belt with the polyvinyl chloride plastic material in liquid or viscous form; scraping off substantially all of the upper surface of the plastic material; coating the exposed surface of the molding belt with a viscous polyvinyl chloride resin to provide a base for the resin in said mold cavities, said coating resin containing a sufficient amount of additional plasticizer to make said base softer than the resin in said mold cavities; gelling the plastic material on the endless molding belt by heating to an elevated temperature; adding a foam backing material to the gelled plastic material; heating the resultant laminate to effect curing of the plastic material; cooling the cured plastic laminate; and then stripping the cooled plastic product from the endless molding belt.

---

The present invention relates to a synthetic suede product and to the process for preparing the same. More particularly, the present invention pertains to a novel synthetic suede product prepared from an improved molding process utilizing vinyl plastisol.

In recent years the search for a commercially acceptable synthetic suede-like material has quickened. Proposed uses of such material include rainwear, suits and dresses; footwear such as rubbers and galoshes; accessories such as handbags, gloves, and hats; surfacing material such as carpets and synthetic grass; and the like. Natural suede has been employed for many of the foregoing products because of its attractive shading, non-lustrous, non-reflective surface characteristics. However, natural suede is a rather expensive material and often represents a major portion of the cost of articles made therefrom. In addition, natural suede has the disadvantage of readily showing dirt or other spots on its surface and requires constant cleaning and brushing to maintain its attractive appearance. Natural suede is also easily stained, and the stains are difficult if not impossible to remove without damaging the original appearance and feel.

The wide variety of processes heretofore proposed for the preparation of synthetic suede material are described in U.S. Pat. Nos. 3,098,262 and 3,141,051. Such processes include pressure molding or embossing; treating or brushing the surface of relatively smooth plastic material to roughen it in order to obtain a soft, cushiony appearance and feel; coating the surface of the smooth plastic material with an adhesive and then dusting finely-divided fibrous material thereon to obtain the desired effect; and coating the surface of a smooth plastic material with a film containing a foaming agent so as to form on the coated surface a film of porous, foamed plastic material having a soft, warm feel. Another recently proposed process (U.S. Pat. No. 2,835,607) involves fixably embedding a powdered, non-hygroscopic material in the surface of a plastic material and then dissolving out the powdered material by the use of special solvents to prepare a product having a suede-like appearance. In contrast to the above described processes, U.S. Pat. Nos. 3,098,262 and 3,141,051 initially prepare negative molds by the use of embossing tools sharpened steel rods, needles, rods, and the like; and then press plastic materials or mold the plastic materials into the surface cavities of the negative mold. The use of a negative mold as an endless, flexible band is also described in U.S. Pat. No. 3,190,947 wherein the band is formed directly from the natural material, e.g., natural suede, being copied by casting with a liquid silicone resin. Synthetic products are then prepared by the process comprising casting a vinyl plastisol onto the exposed surface of the negative mold with subsequent curing to form a solid product and stripping of the solid synthetic product from the negative mold. Vinyl plastisols or vinyl resins are generally the preferred plastic feed materials in each of the foregoing processes, because the vinyl resins are comparatively inexpensive and molded vinyl products are very abrasion or wear-resistant. Such synthetic products can also be readily cleaned without risk of permanent surface damage. However, since conventional vinyl products have highly bright, reflective and non-cushiony characteristics, the molding processes described above as well as others described in the literature are directed mainly to the alteration of such characteristics to obtain a simulated suede-like surface having the appearance and feel of natural suede. The numerous prior art processes are indicative both of the difficulties involved and failure of such processes to produce commercially suitable products in large scale operations. The most serious shortcomings of such processes are the fact that the final synthetic products did not satisfactorily simulate the essential characteristics of natural suede and the processes could not be carried out at rates which are required for commercial exploitation.

One object of the present invention is to provide a synthetic suede product having the shading, non-lustrous, non-reflective and brushed appearance as well as other characteristics of natural suede.

Another object of the present invention is to provide a synthetic suede product from a synthetic thermoplastic material such as polyvinyl chloride which not only simulates the visual characteristics of natural suede but which is also resistant to staining and can be readily cleaned without deleteriously affecting the characteristic suede-like surface appearance and feel.

A further object of the present invention is to provide an improved molding process for preparing sheets of synthetic suede which avoids the shortcomings and the difficulties of the processes heretofore proposed.

A still further object of the present invention is to provide for the preparation of synthetic suede sheets by a continuous molding process which is characterized by comparatively high speed operations, outstanding product quality, consistent product, and other features which are desirable in large scale commercial production.

These and other objects of the present invention will become readily apparent from the ensuing description and the illustrative embodiments.

In accordance with this invention it has been found that an improved synthetic suede-like product can be prepared from liquid or viscous vinyl plastisols having the appearance of natural suede provided the synthetic surface fibers have the following characteristics:

(1) Substantially no draft or taper, i.e., there is no gradual diminution of the diameter of the fibers in the direction of their extension from the synthetic surface or base, (2) The fibers have been longitudinally stretched in the range of about 1½ to 3 times or more of their original length determined by the depth of the molding cavity and their spring-back to approximately their molded size, (3) The diameters of the fibers are small fractions of their lengths, and more specifically the fibers will have a diameter ranging from about 0.0005 to 0.05 inch and a length ranging from about 0.010 to 0.625 inch, and (4) The density of the surface fibers range from about 10,000 to 500,000 per square inch, preferably from about 50,000 to 250,000 per square inch.

As previously discussed, the synthetic suede product of this invention has the further advantage of being more resistant than natural suede to dirt and stains. Furthermore, the present synthetic suede product is much tougher than natural suede and can be subjected to a variety of cleaning and brushing treatments which could not ordinarily be employed with natural suede.

The aforedescribed synthetic suede products are prepared in accordance with the improved molding process of this invention which comprises a series of sequential steps employed in conjunction with an endless, flexible molding belt or band having an external molding surface provided with a multiplicity of minute molding cavities or surface depressions. The sequential steps include filling the mold cavities or depressions with vinyl plastisol, leveling the upper surface of the vinyl plastisol, coating the leveled surface with additional vinyl plastisol, gelling the vinyl plastisol, heating the gelled vinyl plastisol, adding a backing material to the gelled vinyl plastisol, subjecting the resulting structure to dielectric heating, cooling to ambient or lower temperatures, and stripping the cooled cured vinyl structure from the external molding surface and concurrently longitudinally stretching the synthetic surface fibers. When the production of a porous synthetic suede product is desired, the coating step may be omitted or a very thin layer applied so that numerous holes will be left in the suede surface with the result that air or moisture may easily pass therethrough. These steps as well as other steps and features of this molding process will be described in greater detail below.

For a more complete understanding of the invention, reference should be had to the accompanying drawings wherein:

FIG. 1 is a block diagram illustrating the various sequential steps and other aspects of one embodiment of the improved molding process of ths invention.

FIG. 2 is a diagrammatic view in elevation of apparatus suitable for carrying out the molding process.

FIG. 3 is a fragmentary view of a synthetic product having a suede-like surface.

Referring now to FIG. 1 wherein the following features and process steps are set forth:

ENDLESS FLEXIBLE MOLDING BELT

An endless, flexible belt, which functions as a carrier and a casting mold, is prepared to present an exposed surface configuration which is the reverse or negative of the general surface configuration desired in the synthetic suede product. A molding belt representative of certain prior art processes is described in U.S. Pat. No. 3,098,262. Elastomeric resins such as silicone rubber or its copolymers, neoprene, flexible epoxy, urethane, fluoroplastics and the like may be employed to form the molding belt. The preferred negative molds are prepared from RTV silicone rubber, having a molecular weight ranging from about 2000 to 3000, since the resulting molds have the desired flexibility, high temperature resistance, and comparatively long life which are properties highly desirable for commercial operations. For imparting a suede finish to the surface of the synthetic product, the exposed surface of the molding belt has a multiplicity of cavities ranging from about 0.010 to 0.625 inch in depth, without draft or untapered, and in a sensity of from about 10,000 to 500,000 per square inch or more. A particularly outstanding molding belt for the purposes of this invention may be prepared by the procedure set forth in my copending U.S. patent application No. 570,950, now U.S. Pat. No. 3,369,949, although it will be understood that other procedures for forming the endless, flexible molding belt may also be utilized.

According to a number of the prior art molding processes employing molds having a textured negative molding surface, it was thought highly desirable to prepare the negative molding surface directly from the type of natural material being simulated. Thus, for example, natural or synthetic suede sheeting has been employed to prepare the negative molding surface of an endless, flexible molding belt. The use of natural suede for such purposes is, of course, quite expensive and generally results in a synthetic product having a surface appearance which did not adequately simulate the natural material so that it had limited if any commercial application. One important feature of the present invention is the discovery that readily available flocked nylon or rayon sheeting may be employed in the preparation of the negative molding surface. In fact, it has been found that the use of such material for this purpose is much better than the use of natural suede and in actual operations leads to the production of synthetic products having the appearance and properties of natural suede.

MOLD FILLING

Although conventional mold filling procedures and apparatus may be employed in the process of this invention, the preferred procedure encompasses a sequential series of compression and releasing steps whereby air entrapped in the exposed surface cavities or depressions is expelled concurrently with mold filling, this mold filling method is also set forth in copending U.S. patent application Ser. No. 671,323, now Pat. No. 3,517,094. More specifically, the mold filling procedure involves the following steps:

(1) Compressing the section of the flexible mold to be filled with the plastic material to expel air from the molding cavities or depressions;

(2) Releasing the compressed section of the flexible mold while its exposed surface is positioned below the surface of a reservoir of the plastic material thereby wetting and filling the molding cavities or depressions;

(3) Compressing the thus filled section of the flexible mold to expel plastic material and any remaining entrapped air therefrom; and (4) Releasing the compressed section of the flexible mold again while its exposed surface is positioned below the surface of a reservoir of the plastic material thereby completely filling the molding cavities or depressions with the liquid or viscous plastic material and ensuring a faithful reproduction of the textured surface of the endless molding belt.

The use of the above described mold filling procedure has the advantage of eliminating the flaws and non-uniformity in the final molded products which are attributable to the presence of entrapped air in the molding cavities and incomplete filling of the molding cavities with the plastic feed material. Although the mold filling method outlined above has been found effective for commercial operations, it will be understood that additional, compression and releasing-filling steps may also be employed if desired because of the complexity of the textured surface of the negative molding surface or because of the nature of the plastic feed material. In some operations even faster mold-filling can be accomplished by utilizing a series of three or more of such sequential steps. Suitable apparatus for carrying out this mold filling method will be described in connection with FIG. 2. However, other types of apparatus utilizing this concept may also be employed.

LEVELING

After the exposed surface of the molding belt has been filled with the plastic material, the upper surface of the latter is leveled in order to ensure uniformity and to obtain a bubble-free synthetic product. Leveling can be accomplished by means of a conventional doctor blade or, as shown in FIG. 2, by passing the plastic-filled molding surface under the adjustable rear or back wall of the molding zone. Either the entire surface layer of vinyl plastisol is scraped off or a thin layer left thereon. Generally, it is preferred to remove the entire surface layer to achieve the advantages referred to above and leave plastic only in the cavities or depressions formed in the surface of the molding belt.

COATING

The next step in the improved molding process involves coating the exposed surface of the plastic-filled molding belt with an additional plastic material to provide the base or surface for the suede-like finish of the final product. Although this base may vary in thickness depending upon the commercial use of the final molded product, a thickness of from 2 to 40 mils is generally acceptable. In general, a vinyl plastisol, either in liquid or viscous form, is also employed for this purpose. Preferably, the vinyl plastisol will differ from the vinyl plastisol used in the mold filling step. This difference permits changes to be made in the softness, hardness, or color characteristics of the final product. As previously discussed, this coating step may be omitted entirely to obtain a porous synthetic suede product which also has numerous commercial applications. In the preparation of synthetic suede, the vinyl coating composition will contain an additional plasticizer so that the base will be softer than the individual synthetic fibers. Unusual coloring and shading effects can also be readily achieved by having the color of the plastic base differ from the color of the plastic fibers.

GELLING

The entire plastic material on the exposed surface of the molding belt is then gelled by heating to a temperature sufficient to cause gelling, generally from about 100° to 200° F., by conventional heating means such as infrared lamps.

BACKING

For most purposes a continuous ply or plies of textile, non-woven fabric, paper, threads from a spool, elastomeric sheet, or a layer of sponge or foam material is applied as a backing to the gelled plastic molded product. The backing may be either preformed or formed in situ and may vary again depending upon the intended commercial application of the final molded product. The use of vinyl plastisol or polyurethane foam as a backing material have been found to be particularly advantageous in the manufacture of synthetic suede products, since the resulting molded product will have the soft, cushiony feel which is also characteristic of natural suede. The thickness of the backing may vary over a wide range, although for most a thickness of from about 15 to 60 mils is sufficient.

DIELECTRIC HEATING

The resulting plastic laminate is then subjected to radiant energy and, usually, dielectric heating for effecting curing. In accordance with one feature of this invention, the use of dielectric heating has been found to be very good because of the incorporation of the vinyl plastisol at right angles to the plane of the molding belt and because it is necessary to get heat inside the belt without the danger of overheating and damaging the molding belt. In order to accomplish uniform curing and to avoid damaging the material forming the molding belt, dielectric heat has preferably been employed wherein at least two spaced parallel treating bars or plates are positioned above and/or below the molding belt to provide a field encompassing the molding belt. Other suitable heating means may be used.

COOLING

The thus cured plastic laminate is cooled to a suitable temperature, preferably from about 30° to 170° F.

STRIPPING

The finished plastic product is then stripped from the molding belt by conventional means, as shown in FIG. 2, and wound up on a roller. In accordance with an important aspect of the present invention, the stripping is carried out while the plastic material is at a temperature within the range of about 30° to 100° F.

Under these conditions, the synthetic surface fibers may be stretched as they are pulled from the mold cavities and then spring back to their molded size. The degree of longitudinal stretching generally ranges from about 1½ to 3 times the length of the synthetic fiber in the mold cavity.

The plastic feed material which may be employed and which is referred to herein as polyvinyl chloride resins or plastisols, but which includes all of the haloethylene polymers composed predominantly of a polymerized haloethylene having from one to two halogen atoms selected from the group consisting of chlorine, bromine and fluorine atoms attached to only one of the carbon atoms, such as homopolymers of vinyl chloride, vinyl bromide, vinyl fluoride, vinylidene chloride, vinylidene bromide and vinylidene fluoride and interpolymers or copolymers of two or more of these monomers. Copolymers or interpolymers made from monomeric mixtures containing at least one haloethylene monomer together with a lesser amount of one or more copolymerizable monoolefinic monomers can also be employed. Monoolefinic materials which can be co- or interpolymerized with the haloethylene monomers include vinyl esters such as vinyl acetate, vinyl propionate, vinyl butyrate, vinyl chloroacetate, vinyl chloropropionate, vinyl benzoate, vinyl chlorobenzoate, and others; acrylic and alphaalkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octylacrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide acrylonitrile, chloroacrylonitrile, methacrylonitrile, ethacrylonitrile, and the like; vinyl aromatic compounds such as styrene, dichlorostyrene, vinyl naphthalene, and others; alkyl esters of maleic and fumaric acids such as dimethyl maleate, diethyl maleate, and others; vinyl alkyl ethers and ketones such as vinyl methyl ether, vinyl ethyl ether, vinyl isobutyl ether, 2-chlorethyl vinyl ether, methyl vinyl ketone, ethyl vinyl ketone, isobutyl vinyl ketone, etc.; and in addition other monoolefinic materials such as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=C$ group. When utilizing interpolymers or copolymers the proportions of the various monomers in the monomeric mixtures polymerized to give the interpolymer may be varied considerably as long as the haloethylene monomer constitutes at least 50% by weight of the total. For example, there may be used copolymers of from 50 to 99%, or more preferably from 70 to 95%, by weight of the haloethylene monomer together with from 1 to 50%, more preferably from 5 to 30%, by weight of a vinyl ester, or an acrylic or methacrylic ester or any of the other monoolefinic materials mentioned above, or any two, three, four, etc., of these. Tripolymers of from 50 to 90% by weight of vinyl chloride, from 5 to 45% by weight of vinylidene chloride, and from 5 to 45% by weight of a vinyl ester such as vinyl acetate or vinyl benzoate, or an acrylic or methacrylic ester are examples of vinyl halide polymers which may be used. Of the various polymers disclosed, those composed of a vinyl halide, especially vinyl chloride, are preferred. It is also possible to employ halogenated polymers such as chlorinated polyvinyl chloride. Many conventional plasticizers for the haloethylene containing polymers, dioctyl diphenyl phosphate, tricresyl phosphate, tributoxy ethyl are suitable for use in the practice of this invention and include materials such as phosphate, dioctyl adipate, dioctyl azelate, dioctyl phthalate, dibutyl phthalate, hexachlorodiphenyl oxide, toluene sulfonamide-aldehyde resin, a composition such as a mixture of a water-insoluble thermoplastic cellulose ether, di(4-tertiary butyl phenyl) monophenyl phosphate and di(4-tertiary butyl phenyl) mono (5-tertiary butyl-2-xenyl) phosphate, various polymeric plasticizers, etc. The plasticizers are used in amounts necessary to give the required flexibility to the fused polymer and may vary widely in amounts depending on type of plasticizer. From about 30 to 200 parts by weight of the plasticizer can be used for every 100 parts by weight of the polymer although for best results it is preferable that the polymeric composition comprise from about 50 to 100 parts by weight of plasticizer for every 100 parts by weight of the polymeric material present. When making plastisols and liquid-like masses, the temperature during mixing of the polymer and the plasticizer should be below the gel point and preferably not above room temperature, about 25° C., to provide a liquid or pourable composition having a viscosity of from about 200 to 40,000 centipoises and up to as high as 130,000 centipoises.

The polymeric haloethylene compositions may also contain minor amounts of suitable conventional stabilizers such as basic lead carbonate, lead oxide, alkaline earth silicates, lead silicate, lead stearate, titanium dioxide, lead phenolate, barium-cadmium organics, calcium-zinc organics, and the like. Such stabilizers are preferably used in an amount of from 0.1 to 10 parts by weight per 100 parts by weight of haloethylene containing polymer. Two typical stabilizer compositions are set forth below:

Composition A

| | Percent |
|---|---|
| Barium dinonylphenate | 30 |
| Cadmium bis (2-ethyl hexoate) | 18 |
| Dithenyl isooctyl phosphite | 52 |

Composition B

| | Percent |
|---|---|
| Barium dinonylphenate | 28 |
| Cadmium bis (2-ethyl hexoate) | 8 |
| Zinc bis (2-ethyl hexoate) | 12 |
| Dithenyl isooctyl phosphite | 52 |

All of the above percentages are by weight. Generally the stabilizers are available as solutions in mineral spirits, approximately 50% by weight. Other suitable compounding additives for haloethylene polymers may be incorporated in the polymer composition such as extenders, fillers, dyes, color pigments, metal particles, fungicides, germicides, and the like.

The improved molding process of this invention will be more fully understood by referring to FIG. 2 wherein the molding plastic feed material has the following formulation:

| | Parts by weight |
|---|---|
| Polyvinyl chloride resin | 100 |
| Dioctyl phthalate | 35 |
| Dioctyl adipate | 10 |
| Stabilizer A | 5 |

In FIG. 2, a flexible, endless, silicone rubber belt 1 having its exposed surface 2 is specially prepared from flocked rayon to present a configuration which is the reverse or negative of the suede-like surface configuration desired in the plastic product. The exposed surface 2 of flexible belt 1 has a multiplicity of cavities, about 0.030 inch in depth, untapered, and numbering from about 10,000 per square inch or more. Flexible belt 1 moves over the outer periphery of roller 3 and at least one other spaced apart roller 50 provided with driving means (not shown) which is parallel to roller 3 and positioned after the intermediate treatment and stripping steps.

Molding belt 1 moves horizontally in the direction of the arrows shown, passes around roller 3 provided and enters molding zone 10 having adjustable front and rear sides 11 and 12, respectively. Molding zone 10 is rectangular in shape, somewhat narrower in width than belt 1, and with an open top and bottom. The lower edges of each of the four walls of molding zone 10 are in close proximity to exposed surface 2 of belt 1. Front wall 11 is adjusted to contact exposed surface 2 to ensure that any solid contaminants are scraped from the exposed surface of belt 1 prior to passage into molding zone 10. A series of pressure rollers 4, 5, and 6 are positioned so as to divide molding zone 10 into three separate, substantially liquid tight sections where the side walls are in contact with belt 1. Roller 5 is also provided with driving means (not shown) which is synchronized with the driving means of roller 50. In order to prevent the liquid vinyl plastisol from moving from one reservoir to the preceding one, sqeegees (not shown) are positioned on the upper exposed surfaces of rollers 4 and 6. As belt 1 continuously passes under the lower edge of front wall 11, it is compressed between the outer peripheries of rollers 4 and 5 to expel the air in the molding cavities located in exposed surface 2. When the compressed section of belt 1 passes over the upper periphery of roller 5 it is released from the compression while submerged in a reservoir of liquid vinyl plastisol 7 located between rollers 4, 5, and 6. The liquid vinyl plastisol prewets the molding surface and enters into the molding cavities on exposed surface 2, but is subsequently expelled along with any remaining entrapped air from the cavities as belt 1 is recompressed between rollers 5 and 6. This compressed section of belt 1 is then released while submerged in reservoir 8 of liquid vinyl plastisol maintained between roller 6 and back wall 12 of molding zone 10. The vinyl plastisol completely fills the molding cavities and coats the surface of exposed surface 2. The depth of this coating is regulated and leveled by adjusting the space between the lower edge of wall 12 and exposed surface 2.

The liquid vinyl plastisol employed in reservoirs 7 and 8 generally have the same formulations and ordinary liquid feeding means (not shown) may intermittently supply liquid vinyl plastisol to each of the reservoirs to maintain them at the desired levels.

As the molding belt 1 passes out of molding zone 10, it passes into reservoir 20 containing a vinyl plastisol having the following formulations:

| | Parts by weight |
|---|---|
| Polyvinyl chloride resin | 100 |
| Dioctyl phthalate | 65 |
| Dioctyl adipate | 15 |
| Stabilizer A | 5 |

After the coating is applied, molding belt 1 moves under doctor blade 21, preset to determine the depth of the coating. The composite plastic material is then exposed to a suitably elevated temperature to effect gelling. This gelling occurs while molding belt 1 passes from doctor blade 21 through heating zone 22. Usual temperatures employed range from 100° F.–200° F., in order to effect the desired degree of gelling. A prefoamed polyvinyl chloride foam backing 25 is taken from supply roller 27 and adherently laminated to the exposed surface of the polyvinyl chloride resin mold surface by means of pressure roller 26. Such foam backing 25 is at least partially precured to provide sufficient strength therein to enable it to be processed and handled as described. Or, if desired, a layer of uncured foamed polyvinyl chloride resin material could be formed by a doctor blade or equivalent by supply of such material, or a foamable PVC plastisol to the doctor blade substituted for the roll 26. The polyvinyl chloride resin, or other material used, would then be gelled and cured in the heater 30, or the cure would be completed in such heater. The laminated plastic product carried on molding belt 1 is then preferably passed into a dielectric heater 30, or other heating means, wherein it is subjected to an electrical field generated by rod 31 or between rods or plates 31 and 32 and a suitable power source 33. The laminate is uniformly cured and the layers thereof are bonded together by this treatment and the laminate is then passed into cooling zone 40. The latter zone should provide cooling temperatures of 0° F. to 70° F. The cooled laminated polyvinyl chloride molded product is then stripped at a suitable temperature usually in the range from 35° F. to 170° F., from molding belt at a point adjacent roller 3 and is would up on roller 51. A separate cooling step may be employed just prior to stripping. Molding belt 1 is then returned to the molding, or mold filling zone 10. In the stripping step, the synthetic surface fibers may be stretched in a longitudinal direction to about 3 times their original length when pulled from the surface cavities of molding belt 1.

As will be understood, the apparatus illustrated in FIG. 2 may be provided with additional rollers and other equipment well known to the art and which do not pertain to the novel molding concepts of this invention. Utilizing the apparatus of FIG. 2 and the sequential progressive, continuous processing steps of this invention have led to the production of synthetic suede sheeting of uniformly high quality with the desired properties as set forth above. In addition, the molding process not only provides an outstanding synthetic suede product, but also permits such a product to be made at rates and other conditions which are commercially feasible. A fragmentary section of such a product is shown in FIG. 3 wherein the upper surface of polyvinyl chloride foam backing 80 is attached to the polyvinyl chloride resin base 81 having a multiplicity of longitudinal polyvinyl chloride fibers 82 which readily interlock in a substantially flat direction thereby contributing to the desired shading effects when brushed.

The rollers 4, 5 and 6 preferably are adjustably positioned to provide any desired compression action on the molding belt being processed.

By adjusting the position of the wall 12 in the mold filling or molding zone 10, the belt 1 can be scraped so that substantially all of the molding material on the exposed mold surface 2 can be removed leaving molding material only in the mold surface cavities. Such adjustment of the wall 12 can be provided by conventional means.

In some instances, the mold filling zone may have molding material forming a pool therein covering the rolls 4, 5 and 6. The rolls 4, 5 and 6 may be adjustably positioned, if desired, by any suitable means.

While particular embodiments of this invention are shown above, it will be understood that the invention is obviously subject to variations and modifications without departing from its broader aspects. Thus, for example, the improved molding process of this invention may also be effectively employed to prepare synthetic sheeting other than suede and may also utilize various liquid or viscous plastic feed material other than vinyl resins.

What is claimed is:

1. A continuous process for preparing a synthetic suede product having the appearance and shading characteristics of natural suede leather which comprises the following sequential steps:
    (a) passing a section of a flexible, endless molding belt with an exposed surface provided with a multiplicity of minute mold cavities, in a density of from about 10,000 to 500,000 per square inch, into a molding zone;
    (b) filling said mold cavities in said molding belt section with a viscous, uncured polyvinyl chloride resin;
    (c) scraping substantially all of said viscous resin off of the exposed surface of said molding belt section;
    (d) passing said section of the molding belt with the mold cavities full of said resin out of said molding zone;
    (e) coating said exposed surface with a viscous polyvinyl chloride resin to provide a base for the resin in said mold cavities, said coating resin containing a sufficient amount of additional plasticizer to make said base softer than the resin in said mold cavities;
    (f) heating the resulting coated section of the molding belt to gel said resins;
    (g) uniformly curing said gelled resins;
    (h) cooling said cured resins to a temperature of from about 0° to 70° F.; and
    (i) stripping the resulting cooled, cured synthetic resin product from the endless molding belt.

2. The process of claim 1 wherein a foam backing material selected from the group consisting of polyvinyl chloride foam and polyurethane foam is applied following step (f) but prior to step (g).

References Cited

UNITED STATES PATENTS

| | | | |
|---|---|---|---|
| 2,821,746 | 2/1958 | Bicher | 264—214 |
| 3,098,262 | 7/1963 | Wisotzky | 264—214 X |
| 3,141,051 | 7/1964 | Takai | 83—2 X |
| 3,196,062 | 7/1965 | Kristal | 264—47 X |
| 3,316,592 | 5/1967 | Forrest | 161—62 UX |
| 3,328,225 | 6/1967 | Urbanic | 156—79 UX |
| 3,351,510 | 11/1967 | Harris | 264—214 X |

DONALD J. ARNOLD, Primary Examiner

P. A. LEIPOLD, Assistant Examiner

U.S. Cl. X.R.

117—45; 161—62, 159; 264—167, 214, 216